United States Patent
Esmail et al.

(10) Patent No.: US 10,393,864 B2
(45) Date of Patent: Aug. 27, 2019

(54) HIDDEN ULTRASONIC SENSOR ASSEMBLY

(71) Applicant: Tesla Motors, Inc., Palo Alto, CA (US)

(72) Inventors: Adnan Esmail, Palo Alto, CA (US); William B. Stockton, San Francisco, CA (US); Joseph Daniel Penniman, Sunnyvale, CA (US); David Kalinowski, Redwood City, CA (US); Jing Cai, San Francisco, CA (US); Erik Raymond Hammer, Leduc (CA); Jochen Wilden, San Jose, CA (US)

(73) Assignee: Tesla, Inc., Palo Alto, CA (US)

( * ) Notice: Subject to any disclaimer, the term of this patent is extended or adjusted under 35 U.S.C. 154(b) by 321 days.

(21) Appl. No.: 15/253,221

(22) Filed: Aug. 31, 2016

(65) Prior Publication Data

US 2017/0059697 A1     Mar. 2, 2017

Related U.S. Application Data

(60) Provisional application No. 62/212,529, filed on Aug. 31, 2015.

(51) Int. Cl.
| | |
|---|---|
| *G01S 7/521* | (2006.01) |
| *G10K 11/00* | (2006.01) |
| *B60J 5/04* | (2006.01) |
| *G01S 15/93* | (2006.01) |

(52) U.S. Cl.
CPC ............. *G01S 7/521* (2013.01); *B60J 5/0412* (2013.01); *G10K 11/004* (2013.01); *G01S 2015/937* (2013.01)

(58) Field of Classification Search
CPC .. G01S 7/521; G01S 2015/937; B60J 5/0412; G10K 11/004

USPC ........................................................ 73/644
See application file for complete search history.

(56) References Cited

U.S. PATENT DOCUMENTS

| | | | | |
|---|---|---|---|---|
| 2001/0023623 | A1* | 9/2001 | Killion .................. | F16F 15/264 74/603 |
| 2007/0062292 | A1* | 3/2007 | Sato ...................... | B60R 19/483 73/649 |
| 2007/0115102 | A1* | 5/2007 | Nakano .................. | G01S 7/521 340/435 |
| 2010/0208553 | A1* | 8/2010 | Massa ..................... | G01F 1/662 367/93 |
| 2015/0185188 | A1* | 7/2015 | Eidel ..................... | G01S 15/931 73/617 |
| 2016/0139250 | A1* | 5/2016 | Treptow ................ | B06B 1/0644 367/180 |

* cited by examiner

*Primary Examiner* — Lisa M Caputo
*Assistant Examiner* — Rose M Miller
(74) *Attorney, Agent, or Firm* — Garlick & Markison; Bruce E. Garlick

(57) ABSTRACT

An ultrasonic sensor assembly is placed against an inside surface of a panel for sensing objects on an opposite side of the panel and includes an ultrasonic sensor, a preload structure, a coupling element, and a damping material. The preload structure applies a preload on the ultrasonic sensor toward the inside surface of the panel. The coupling element interfaces between the ultrasonic sensor and the inside surface of the panel. The damping material is placed against the inside surface but not where the coupling element interfaces between the ultrasonic sensor and the inside surface. The coupling element may include a matrix material that is reinforced with a filler.

16 Claims, 5 Drawing Sheets

HIDDEN ULTRASONIC SENSOR ASSEMBLY

CROSS REFERENCE TO RELATED APPLICATIONS

The present application claims priority pursuant to 35 U.S.C. § 119(e) to U.S. Provisional Application No. 62/212,529, filed 31 Aug. 2015, entitled "Hidden Ultrasonic Sensor Assembly", which is hereby incorporated herein by reference in its entirety and made part of the present U.S. Utility Patent Application for all purposes.

BACKGROUND

For a few decades, some vehicle models have been equipped with proximity sensors to help the driver avoid running into obstacles in certain situations, such as when going in reverse. These sensors have generally been of the exposed type, where the vehicle has a small opening in a panel or fascia, and the sensor is mounted in the opening where it extends somewhat from the surface. To make the sensors less visually distracting, they are sometimes colored based on the vehicle surface where they are mounted. Nevertheless, the sensors are usually noticeable, as they are often placed in otherwise smooth decorative surfaces.

DETAILED DESCRIPTION

Figure 1:
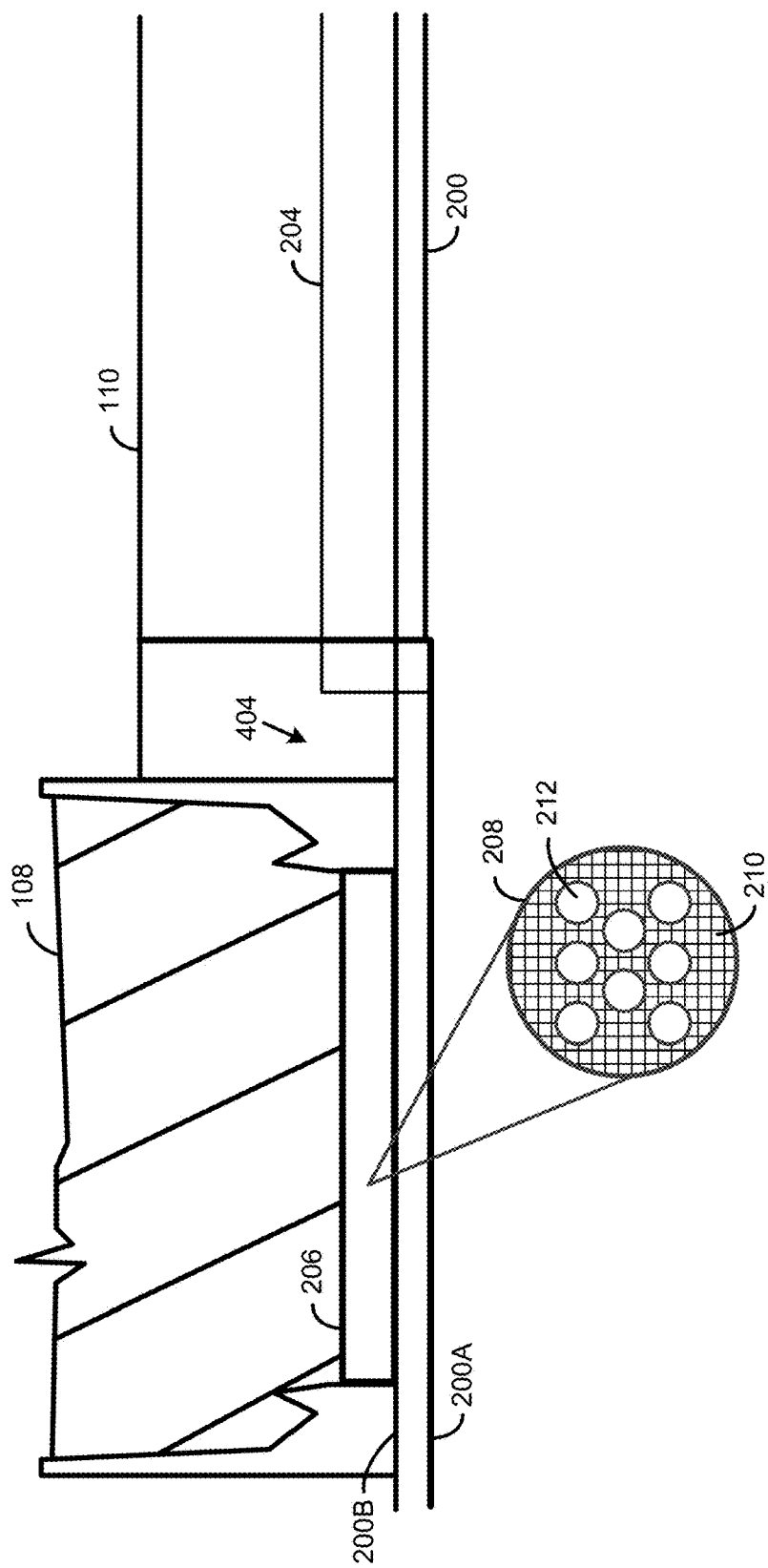
FIG. 1 shows a partial cross section of an example of an ultrasonic sensor assembly when mounted inside a body panel.

This document describes examples of systems and techniques for mounting an 25 ultrasonic sensor assembly on the inside of exterior vehicle surfaces where it is not visible from the outside (i.e., the sensor is "hidden"), such that the sensor can range through the material and detect objects near the vehicle. This not only eliminates the unsightly sensor heads that can be seen dotting the bumper fascia of many vehicles, but it also creates increased flexibility by allowing the assembly to be mounted behind panel materials of different transmissive properties, such as metals and plastic.

Implementations can include any or all of the following features. The ultrasonic sensor assembly further comprises an acoustic foam configured for absorbing airborne acoustic waves. The acoustic foam is placed on top of the damping material. The damper material has an opening in which the coupling element interfaces between the ultrasonic sensor and the inside surface, wherein the opening is larger than the coupling element so that an area of the inside surface exists between the coupling element and the damping material, and wherein the acoustic foam is positioned so as to substantially cover the area of the inside surface. The coupling element comprising a matrix material that is reinforced with a filler. The matrix material comprises an elastomer or a 1 viscoelastic material. The matrix material comprises Silicone. The filler comprises a mesh. The filler comprises fiberglass. The panel is part of a door on a vehicle. The door is a dual hinge door configured for opening and closing substantially in a vertical direction. The preload structure is configured for being attached to the inside surface.

An ultrasonic sensor assembly is configured for mounting on the inside surface of a vehicle panel to hold an ultrasonic sensor against the inside surface with a certain amount of preload. The preload serves to ensure proper transmission and reception of acoustic waves by 5 the sensor through the panel. The assembly can include a holder or other bracket with any suitable number of legs, such as three legs. For example, the holder can be positioned in the center of the assembly, and the (three) legs can extend radially from the holder in a symmetrically spaced relationship. These and other features of the assembly can be formed by an injection molding process. At the end of each leg is a pad. The pad is configured for being 10 attached to the inside surface to mount the holder in place. In some implementations, an adhesive is used for attachment. For example, a UV polymerizing adhesive can be used.

Regarding the mode of attachment to the inside surface, the sensor bracket will be spring-loaded to impart a normal force on the sensor face against the panel. For this reason, a counter force will be pulling against the bond sites of the sensor bracket. This bond line will therefore be under constant tension. The adhesive system should bond well to the bracket material and the panel surface material. For example, it should perform well over an intended service temperature range as well as survive in a wet environment, all while maintaining sufficient bond strength to support the constant tensile load. When a sensor is bonded directly to the inner surface of an outer vehicle panel (a "Class A" surface), the adhesive system should additionally impart minimal stresses due to shrinkage-upon-curing, or thermal expansion mismatch. That is, distortion of the outer surface of the panel should be prevented for aesthetic and other reasons.

The bracket can have a housing at its center. This housing can be configured for having the ultrasonic sensor mounted thereto or therein. For example, the housing can include a biasing element such as a spring that acts on the sensor in a direction toward the inside surface. The sensor bracket will be under a light load throughout its life. One can therefore choose a material for the bracket that has sufficient stiffness to minimize stress relaxation, withstand environmental stress cracking or corrosion, and maintain dimensional stability over the full service temperature range and in a wet environment.

The bracket in this example generates the preload on the sensor by being mounted onto the same inner surface that the sensor acts against. In other implementations, however, another structure can instead or additionally be used. For example, the preload can be generated by reacting off another door panel or a frame.

FIG. 1 shows a partial cross section of the ultrasonic sensor assembly when mounted inside a panel 200. For example, this can be a body panel that has an outer surface 200A (e.g., facing away from a vehicle) and an inner surface 200B (e.g., facing into the vehicle). A sensor 108 can be mounted inside the housing. For example, this can be an ultrasonic sensor configured for generating acoustic waves, which are used as object-detecting signals, and for receiving echo return signals when an object is detected. In some implementations, the sensor 108 operates at about 50 kHz and generates vibrations that can be about 500 nm peak-to-peak. This creates an acoustic field on the panel surface that propagates off that surface and outward. The acoustic waves of the reflected returns, moreover, transmit through the various layers of matter with some amount of absorption, reflection, and transmission.

The sensor 108 (here partially shown) is mounted to the inner surface 200B through an opening 404 formed in a damping material 204. Here, the damping material 204 is visible on only one side of the sensor 108, but in some implementations, it can surround the sensor 108. A leg 110 extends from the housing and can have a length suitable for providing a certain preload on the sensor against the inner surface. One or more pads (not shown) can be attached on the leg (e.g., at the end thereof), the pad(s) configured for being mounted to the inner surface through other openings formed in the damping material. The damping material 204 serves to focus acoustic energy and can reduce ring down time. That is, the sensor 108 coupled to the inner surface 200B causes vibrations that propagate radially outward on the panel, and the damper can help direct that burst in the intended direction (i.e., toward the outside) as well as reduce oscillations in the system after such an acoustic burst.

The damping material 204 should dampen the panel vibrations over the frequency (ultrasonic) and intended service temperature range (e.g., −40 to 90 C). The damping material 204 should therefore be bonded intimately to the panel 200 and remain bonded throughout its service life. Panel damping can be accomplished in several ways. Thus damping material 204 may include, but is not limited to, viscoelastic material that absorbs and dissipates acoustic energy via strain and shear, a contained-layer system, panel stiffening material, and/or combinations of these. Parameters that characterize a specific application can include a high resonant frequency (e.g., about 50 kHz), the intended service temperature range, survivability in a wet environment, and the ability of the material to withstand certain manufacturing processes, such as a heating stage that may be part of a painting process. In some implementations, the damping material 204 includes butyl rubber. For example, the surface area and material thickness can be selected to achieve a beneficial signal-to-noise ratio across an intended range of operating temperatures.

The damping material 204 can be mounted onto the inner surface 200B in any suitable way, for example by an adhesive. The size, shape and thickness of the damping material 204 can be selected based on the characteristics of the implementation and its intended use. The damping material 204 can have one or more openings that expose part of the underlying inside surface 200B, such as the opening 404. For example, this can be one or more circular opening (s). The openings can be used by the sensor 108 and/or the assembly pads.

When the sensor 108 operates, it goes through a firing phase where the acoustic waves are generated, followed by a ring down phase where the sensor 108 is no longer signaling but some amount of residual vibrations occur. Assuming that at least one object is located within the range of the sensor 108, the sensor 108 should eventually receive an echo return signal.

To improve transmission and reception, and reduce noise, a coupling element 206 can be placed between the sensor 108 and the inner surface 200B of the panel 200. This coupling element 206 interfaces between the sensor 108 and the panel 200 such that one side of the coupling element 206 abuts the sensor 108 surface and the other side abuts the inner surface 200B of the panel 200. The assembly can benefit from acoustic impedance matching provided by the coupling element. For example, as the acoustic wave is transmitted from the sensor 108 and into the panel 200 material, the coupling element 206 can seek to match the acoustic impedance across each of these layers as well as possible to reduce reflection. The material of the coupling element 206 should therefore interface intimately with the sensor 108 membrane and the panel 200 to transfer acoustic energy efficiently.

For example, here a material 208 of the coupling element 206 is schematically shown to include a matrix 210 that includes one or more types of filler 212. The material 208 can be chosen based on the ability to function over a temperature range and/or to withstand a wet environment. In some implementations, the filler 212 can be a rigid or stiff or high-modulus membrane or acoustic transducing element, such as a mesh, and the matrix can include a viscoelastic or elastomeric material. For example, a Silicone matrix with a fiberglass filler can be used. The high-modulus material can provide low acoustic impedance and good vibrational energy transfer, while a compliant matrix material can maintain intimate wetting of the two surfaces with minimal acoustic losses. The coupling element 206 may be positioned on a face of the sensor 108. For example, the coupling 206 material and the sensor 108 face can have the same diameter.

In an implementation, an ultrasonic sensor assembly can be mounted inside a body panel. The body panel can be, but is not limited to, a door skin for the door of a vehicle. In some implementations, this can be a door at second row of seats. For example, a second-row door can be of the dual-hinge type, which is configured for opening and closing substantially in a vertical direction. For example, any or all structures described in the following U.S. patents can be used: U.S. Pat. Nos. 8,449,015; 8,511,738; 8,511,739; and/or D678,154, the contents of each of which are incorporated herein by reference in their entirety.

A harness or other conductor can be used with the sensor assembly. This allows another unit to power the sensor 108 on and off, and to receive the sensor 108 output for processing. For example, the sensor 108 can be coupled to a central vehicle body controller or to a dedicated controller for the door.

The above is an example of an ultrasonic sensor assembly configured to be placed against an inside surface 200B of a panel 200 for sensing objects on an opposite side of the panel 200. Such assembly includes an ultrasonic sensor and a preload structure having the ultrasonic sensor attached thereto. Moreover, the preload structure applies a preload on the ultrasonic sensor toward the inside surface. A hidden ultrasonic sensor is more flexible and reliable to use when its vibration frequency can be adjusted to the particular material used in the panel. For example, this improves the signal transmission strength through the material which directly affects its usefulness.

Figure 2:
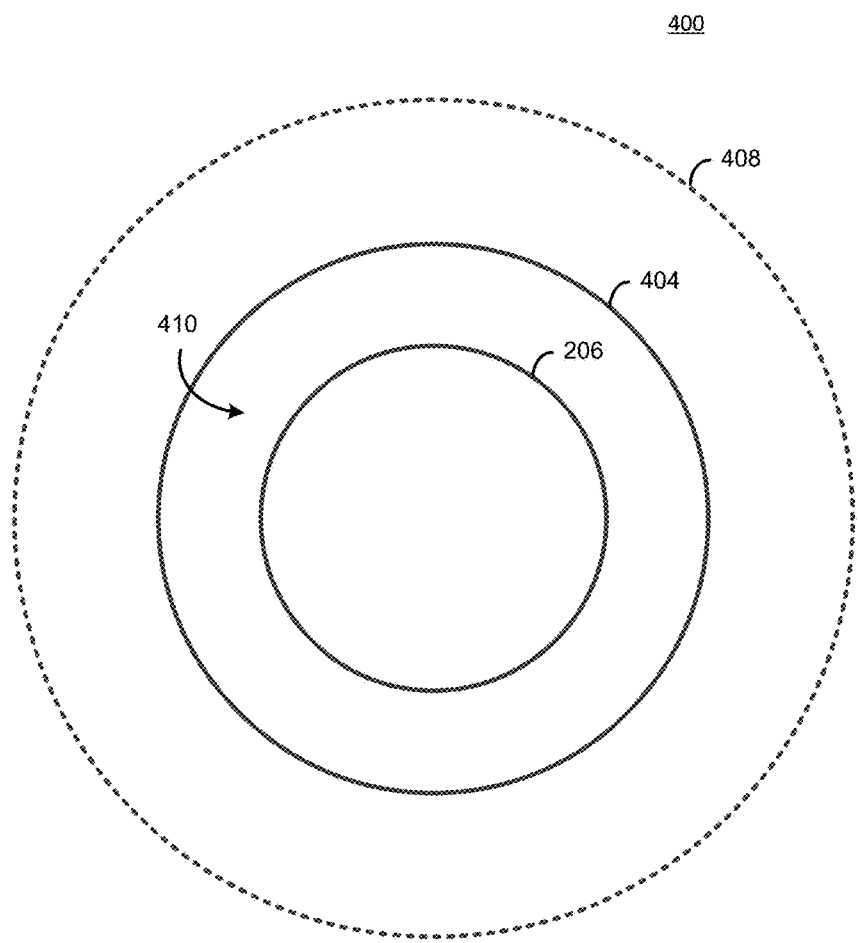
FIG. 2 shows the sensor opening of damping material having an acoustic foam.

FIG. 2 shows a structure 400 of the sensor opening 404 of the damping material 204, which is acoustic foam 408. Only a portion of the damping material 204 is here shown for simplicity. The coupling element 206 is shown inside the opening 404. In some implementations, the opening 404 in the damping material 204 is larger than the coupling element 206 such that an area of the inside panel surface 200B is exposed. Here, an area 410 is defined between the coupling element 206 and the damping material 408. For example, this size difference can be selected to facilitate installation of the sensor assembly.

However, having exposed metal can capture residual acoustic waves, which can create noise in the sensor signals. For example, the sensor 108 is radiating both outward and inward, and if the inward radiation bounces of some structure, such as a door inner frame, a residual acoustic wave will come back and be picked up by the sensor as an echo.

For this reason, the assembly can include the acoustic foam 408 that dampens or absorbs airborne acoustic waves. For example, the acoustic foam 408 is ring shaped and has an inner opening 404 that fits the sensor 206. Many material constructions can be used as acoustic absorbers, such as foams and non-woven battings. An acoustic material can be selected based on its ability to absorb ultrasonic frequencies, perform over an intended temperature range, and perform in a wet environment. In some implementations, a lightweight closed cell foam is used. For example, if an acoustic foam were to absorb water and then freeze due to cold weather, it may not absorb sound as well.

Figure 3:
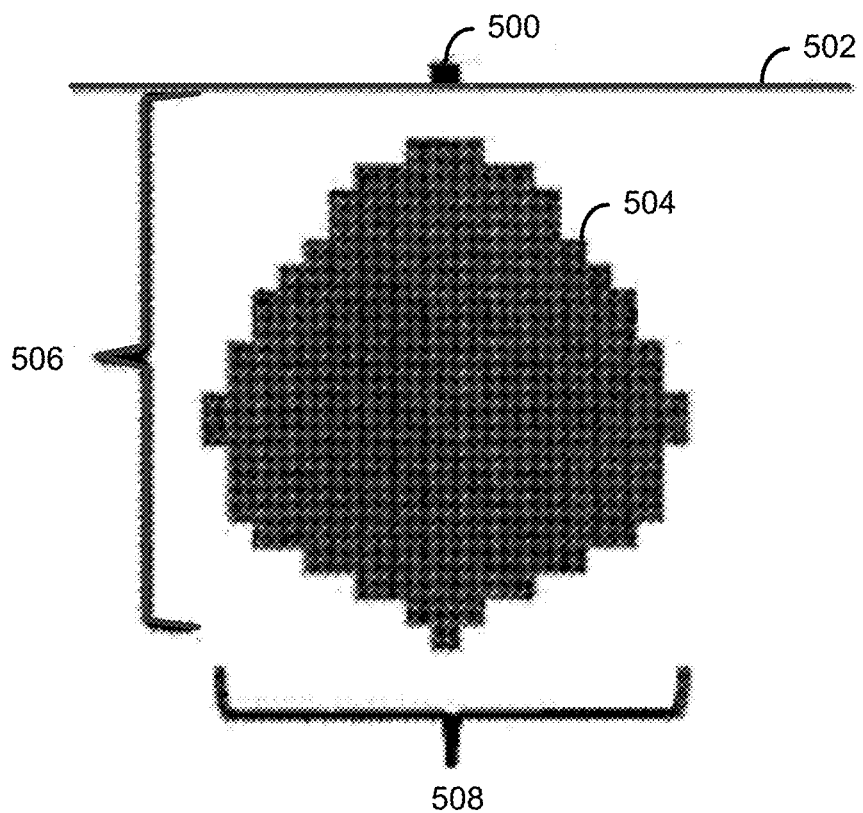
FIG. 3 illustrates a field of view for a hidden ultrasonic sensor assembly.

FIG. 3 illustrates a field of view for a hidden ultrasonic sensor assembly. Here, the assembly includes a sensor 500 that is placed against the inside surface of a panel 502. Any assembly structures described elsewhere herein can also be used, such as a coupling element that interfaces between the sensor and the panel. The field of view generally indicates the area in which the hidden sensor can be used for object detection. Here, for example, the object was a pole having a one-inch outer diameter, and the testing was performed at 25 degrees C. The results in this example show that the sensor has a field of view 504. Generally, the field of view can be characterized by its depth 506 from the panel and its maximum width 508. In this example, the depth was 110 cm and the width was 100 cm.

Figure 4:
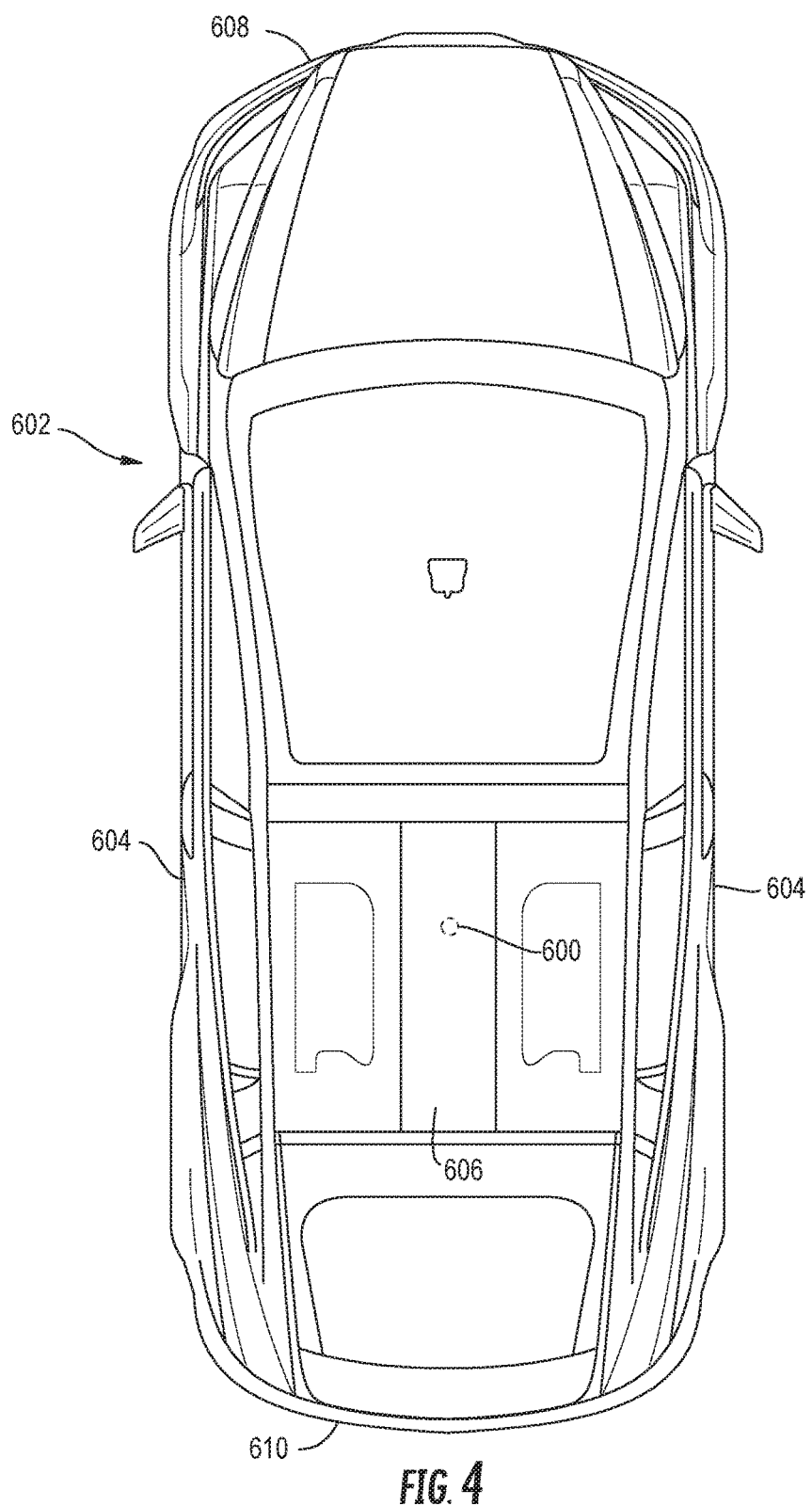
FIG. 4 shows an example of a hidden ultrasonic sensor on a vehicle with dual hinge doors.

FIG. 4 shows an example of a hidden ultrasonic sensor 600 on a vehicle 602 with dual-hinge doors 604. The doors 604 are here the rear passenger doors of the vehicle. Each of these doors can include a hidden ultrasonic sensor assembly, for example in the lower door part thereof, which is the part that extends essentially down the side of the vehicle when the door is closed. The upper door part, on the other hand, can form part of the vehicle's roof when the door is closed.

The doors 604 are hinged to the vehicle body at a spine area 606. For example, the spine area 606 can include a cast aluminum part that is part of the vehicle body. The spine area can be covered by an applique or another cover panel. The applique can be made of any suitable material, including, but not limited to, polycarbonate or a mixture of polycarbonate and acrylonitrile butadiene styrene.

The doors 604 are configured to open in a substantially vertical direction. When the door 604 is in an open position, some or all of the door 604 is positioned above the rest of the vehicle's roof. It is therefore desirable to use a proximity sensor to sense obstructions above the vehicle 602. Because implementations described herein facilitate use of hidden ultrasonic sensors that can range through a variety of materials, such an assembly can advantageously be installed on or near the vehicle's roof. Here, the sensor 600 is shown in phantom because it is positioned underneath the applique that covers the spine area.

The sensor 600 can be part of an assembly that also includes any other structures described elsewhere herein, such as a coupling element that interfaces between the sensor and the panel. Because plastic have different transmissive properties than metal, some aspects of the installation can be changed. For example, because plastic dampens more than metal, the damping element can be made smaller and/or thinner. As another example, the plastic material can be thinned down at the sensor to improve transmission and reception.

The roof-mounted sensor 600 can operate in conjunction with one or more other sensors, such as hidden ultrasonic sensors. For example, this sensor 600 and a sensor hidden in the lower door part can both be active when the door is in motion, so that the system can perform object detection using both their respective fields of view. Hidden ultrasonic sensors can also or instead be placed elsewhere in the vehicle. For example, one or more sensors can be installed in a front end 608 or a rear end 610.

Figure 5:
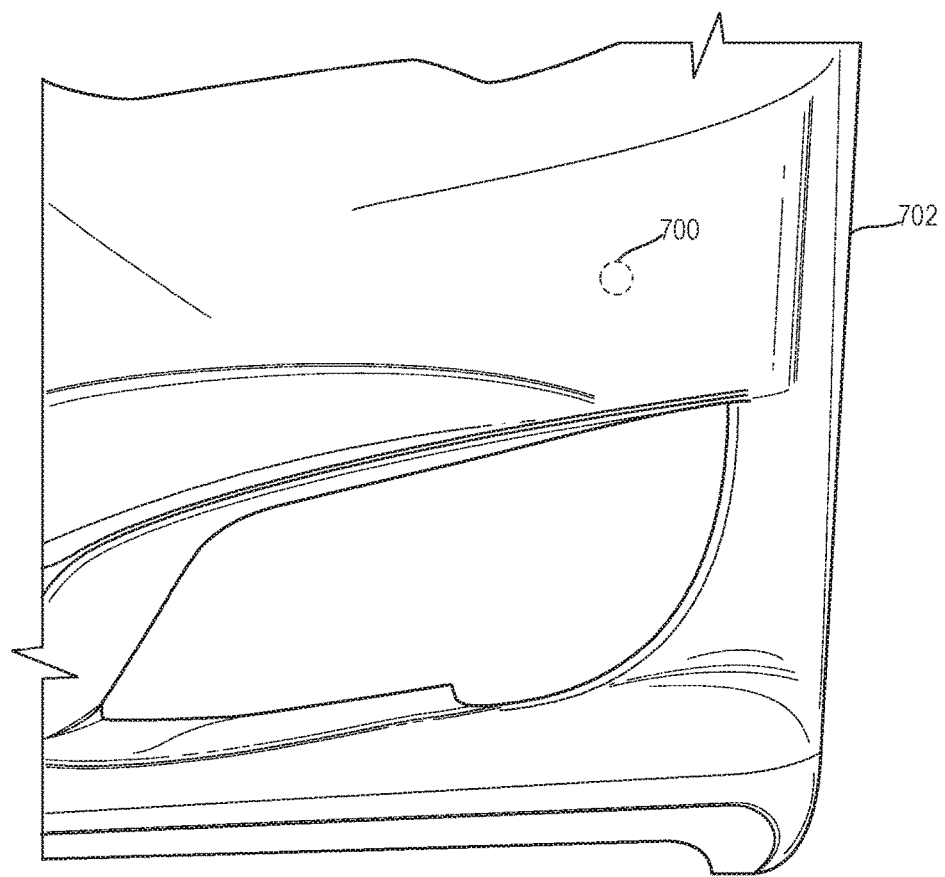
FIG. 5 shows an example of a hidden ultrasonic sensor on vehicle front end.

FIG. 5 shows an example of a hidden ultrasonic sensor 700 on vehicle front end 702. The hidden installation of the sensor assembly provides a clean and elegant solution for proximity detection. As such, several sensors can be installed in the front end without becoming a visual distraction. Similarly, at least one hidden sensor can be provided in another area of the vehicle (not shown), such as a fender or a rear end.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An ultrasonic sensor assembly configured to be placed against an inside surface of a panel for sensing objects on an opposite side of the panel, the ultrasonic sensor assembly comprising:
    an ultrasonic sensor;

a preload structure having the ultrasonic sensor attached thereto, the preload structure configured for applying a preload on the ultrasonic sensor toward the inside surface;

a coupling element that interfaces between the ultrasonic sensor and the inside surface of the panel; and a damping material placed against the inside surface and not where the coupling element interfaces between the ultrasonic sensor and the inside surface; and an acoustic foam placed in contact with the damping material, the acoustic foam configured for absorbing airborne acoustic waves.

2. The ultrasonic sensor assembly of claim 1, wherein the acoustic foam is placed on top of the damping material.

3. The ultrasonic sensor assembly of claim 2, wherein the damping material has an opening in which the coupling element interfaces between the ultrasonic sensor and the inside surface, wherein the opening is larger than the coupling element forming an area of the inside surface between the coupling element and the damping material, and wherein the acoustic foam is positioned so as to substantially cover the area of the inside surface between the coupling element and the damping material.

4. The ultrasonic sensor assembly of claim 1, the coupling element comprises a matrix material that is reinforced with a filler.

5. The ultrasonic sensor assembly of claim 4, wherein the matrix material comprises an elastomer or a viscoelastic material.

6. The ultrasonic sensor assembly of claim 5, wherein the matrix material comprises Silicone.

7. The ultrasonic sensor assembly of claim 4, wherein the filler comprises a mesh.

8. The ultrasonic sensor assembly of claim 4, wherein the filler comprises fiberglass.

9. The ultrasonic sensor assembly of claim 1, wherein the panel is part of a door on a vehicle.

10. The ultrasonic sensor assembly of claim 9, wherein the door is a dual hinge door configured for opening and closing substantially in a vertical direction.

11. The ultrasonic sensor assembly of claim 1, wherein the preload structure is configured for being attached to the inside surface.

12. A method comprising:

generating ultrasonic waves through a panel by an ultrasonic sensor, the ultrasonic sensor having a coupling element that interfaces between the ultrasonic sensor and an inside surface of the panel, the coupling element comprising a matrix material that is reinforced with a filler;

damping acoustic waves in the panel using a damping material placed against the inside surface and not where the coupling element interfaces between the ultrasonic sensor and the inside surface;

absorbing airborne acoustic waves using an acoustic foam, wherein the damping material has an opening in which the coupling element interfaces between the ultrasonic sensor and the inside surface, wherein the opening is larger than the coupling element forming an area of the inside surface between the coupling element and the damping material, and wherein the acoustic foam is positioned so as to substantially cover the area of the inside surface between the coupling element and the damping material; and receiving an echo return wave through the panel using the ultrasonic sensor.

13. The method of claim 12, wherein the acoustic foam is placed on top of the damping material.

14. The method of claim 12, wherein the matrix material comprises an elastomer or a viscoelastic material.

15. The method of claim 12, wherein the matrix material comprises Silicone.

16. The method of claim 12, wherein the filler comprises one or more of a mesh or fiberglass.

* * * * *